(12) United States Patent
Hastings et al.

(10) Patent No.: US 8,749,426 B1
(45) Date of Patent: Jun. 10, 2014

(54) USER INTERFACE AND POINTING DEVICE FOR A CONSUMER ELECTRONICS DEVICE

(75) Inventors: W. Reed Hastings, Santa Cruz, CA (US); Neil D. Hunt, Mountain View, CA (US)

(73) Assignee: Netflix, Inc., Los Gatos, CA (US)

( * ) Notice: Subject to any disclaimer, the term of this patent is extended or adjusted under 35 U.S.C. 154(b) by 1148 days.

(21) Appl. No.: 11/683,858

(22) Filed: Mar. 8, 2007

Related U.S. Application Data

(60) Provisional application No. 60/780,730, filed on Mar. 8, 2006.

(51) Int. Cl.
  *G05B 19/00* (2006.01)
  *G05B 23/02* (2006.01)

(52) U.S. Cl.
  USPC ........... 341/176; 341/173; 345/156; 345/158; 345/173

(58) Field of Classification Search
  USPC .............. 341/173, 176; 340/825.69; 345/156, 345/158, 173
  See application file for complete search history.

(56) References Cited

U.S. PATENT DOCUMENTS

| | | | | |
|---|---|---|---|---|
| 5,519,828 | A * | 5/1996 | Rayner | 715/723 |
| 5,682,326 | A * | 10/1997 | Klingler et al. | 715/202 |
| 5,760,530 | A * | 6/1998 | Kolesar | 310/339 |
| 6,262,724 | B1 * | 7/2001 | Crow et al. | 715/723 |
| 6,330,592 | B1 | 12/2001 | Makuch et al. | |
| 6,765,557 | B1 * | 7/2004 | Segal et al. | 345/173 |
| 7,053,965 | B1 * | 5/2006 | Fan | 348/734 |
| 7,424,202 | B2 * | 9/2008 | Nakamura et al. | 386/278 |
| 2001/0035860 | A1 * | 11/2001 | Segal et al. | 345/173 |
| 2002/0097229 | A1 * | 7/2002 | Rose et al. | 345/173 |
| 2002/0144262 | A1 * | 10/2002 | Plotnick et al. | 725/32 |
| 2003/0169234 | A1 * | 9/2003 | Kempisty | 345/158 |
| 2005/0017890 | A1 * | 1/2005 | Nam et al. | 341/175 |
| 2005/0188406 | A1 | 8/2005 | Gielow et al. | |
| 2006/0013555 | A1 * | 1/2006 | Poslinski | 386/46 |
| 2006/0143657 | A1 * | 6/2006 | Song | 725/52 |
| 2006/0192768 | A1 * | 8/2006 | Lee | 345/173 |
| 2008/0253735 | A1 | 10/2008 | Kuspa et al. | |
| 2008/0302582 | A1 | 12/2008 | Sekhri et al. | |
| 2010/0107107 | A1 | 4/2010 | Corbett et al. | |
| 2010/0241699 | A1 | 9/2010 | Muthukumarasamy et al. | |

OTHER PUBLICATIONS

International search report for application No. PCT/US2011/063583 dated Mar. 28, 2012.

* cited by examiner

*Primary Examiner* — Hai Phan
*Assistant Examiner* — Amine Benlagsir
(74) *Attorney, Agent, or Firm* — Patterson & Sheridan, LLP

(57) ABSTRACT

A remote control comprises a touch-sensitive device configured to detect touching and convert the touching into one or more first data signals; a wireless data transmitter; and logic coupled to the touch-sensitive device and to the wireless data transmitter. The logic is configured to receive the first data signals, transform the first data signals into one or more second data signals that are compatible with a remotely controllable apparatus, and communicate the second data signals to the remotely controllable apparatus using the transmitter. The apparatus can interact with the remote control to generate a graphical user interface on a video display that enables controlling the apparatus using manipulation of the touch-sensitive device. For example, touch gestures can remotely control functions of a DVD player, including functions that are normally accessible only by viewing successive deeply nested menus using a multi-button remote control.

12 Claims, 8 Drawing Sheets

USER INTERFACE AND POINTING DEVICE FOR A CONSUMER ELECTRONICS DEVICE

CROSS-REFERENCE TO RELATED APPLICATIONS; PRIORITY CLAIM

This application claims benefit of Provisional Application 60/780,730, filed Mar. 8, 2006, the entire contents of which is hereby incorporated by reference as if fully set forth herein, under 35 U.S.C. §119(e).

FIELD OF THE INVENTION

The present disclosure generally relates to remote controls and user interfaces for controlling consumer electronics devices.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Personal computer interfaces since the Xerox Alto, Apple Macintosh, and Microsoft Windows on PCs have adopted a user interface based upon a mouse moving a cursor on the screen to select and directly manipulate user interface elements, including buttons, menus, forms, and graphical representations of the underlying concepts being controlled. Later extensions include additional buttons, a scroll-wheel for managing a larger canvas on a smaller display, and a large variety of different forms of mouse, including track wheels, nipple joysticks (typically embedded between the G and H keys on a laptop), or touchpads.

However, consumer electronics (CE) video devices such as video tape recorders, DVD players, CD players, and other devices that are often used in a living room or family room, and are operated from a short distance away using a remote control, have typically followed a "left-right-up-down-select" user interface paradigm, where the remote control is able to move a focus highlight from one control to the next on the screen, where the screen hotspots are pre-programmed by the interface designer (for example, the DVD authoring content producer).

The Sonos music controller interoperates with and controls a CE device that has no display, and the remote-control is linked by bi-directional wireless channel, and has an LCD screen to show the current selection.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
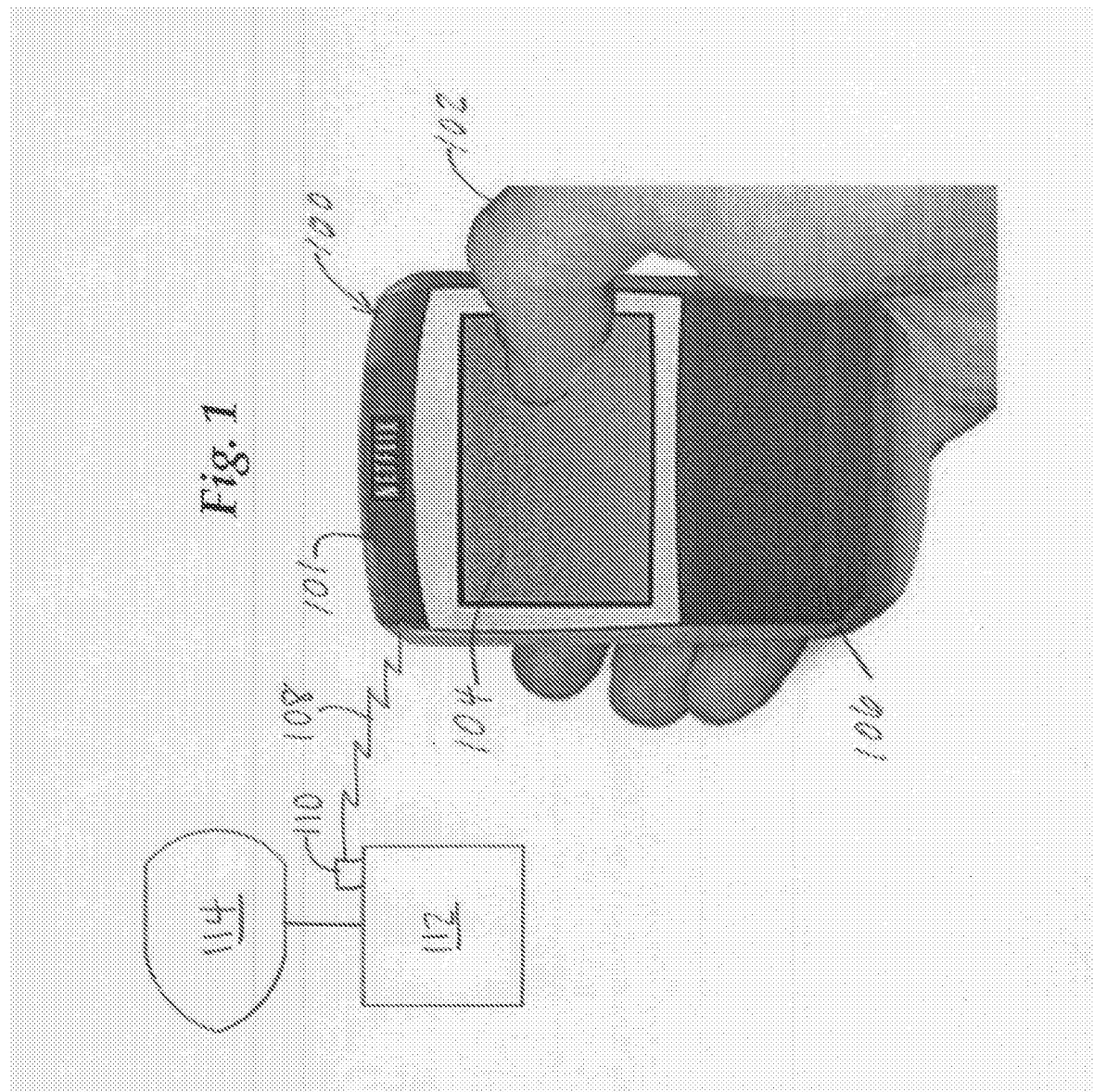
FIG. 1 illustrates a remote-control device.

A user interface and pointing device for a digital video player is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1.0 GENERAL OVERVIEW

In one aspect, a remote control comprises a touch-sensitive device configured to detect touching and convert the touching into one or more first data signals; a wireless data transmitter; and logic coupled to the touch-sensitive device and to the wireless data transmitter. The logic is configured to receive the first data signals, transform the first data signals into one or more second data signals that are compatible with a remotely controllable apparatus, and communicate the second data signals to the remotely controllable apparatus using the transmitter. The apparatus can interact with the remote control to generate a graphical user interface on a video display that enables controlling the apparatus using manipulation of the touch-sensitive device. For example, touch gestures can remotely control functions of a DVD player, including functions that are normally accessible only by viewing successive deeply nested menus using a multi-button remote control.

In one feature, the remote control comprises one or more hard buttons coupled to the logic, wherein the logic is further configured to detect operation of the one or more hard buttons, generate one or more of the second data signals representing operation of the one or more hard buttons, and communicate the one or more second data signals representing operation of the one or more hard buttons to the remotely controllable apparatus using the wireless data transmitter.

In another feature, the touch-sensitive device comprises one or more regions that are associated with specified functions, wherein the logic is further configured to detect a second touching of one or more of the regions, generate one or more of the second data signals representing the second touching of the one or more regions, and communicate the one or more second data signals representing the second touching of the one or more regions to the remotely controllable apparatus using the wireless data transmitter.

In a further feature, the touch-sensitive device comprises a linear region representing control of a quantitative parameter of the remotely controllable apparatus, wherein the logic is further configured to detect a third touching of the linear region, generate one or more of the second data signals representing the third touching of the linear region, and communicate the one or more second data signals representing the third touching of the linear region to the remotely controllable apparatus using the wireless data transmitter.

In another aspect, a system comprises a remotely controllable apparatus comprising a wireless data receiver; a remote control, comprising a touch-sensitive device configured to detect a touching of the touch-sensitive device and convert the touching into one or more first data signals; a wireless data transmitter; and first logic coupled to the touch-sensitive device and to the wireless data transmitter, the first logic is configured to receive the one or more first data signals, transform the one or more first data signals into one or more second data signals that are compatible with the remotely controllable apparatus, and communicate the one or more second data signals to the remotely controllable apparatus using the wireless data transmitter; the remotely controllable apparatus comprises second logic that is configured to receive the one or more second data signals and to generate, based on the one or more second data signals, a graphical user interface for a video display comprising a cursor and one or more graphical controls for the remotely controllable apparatus.

In one feature of this aspect, the second logic is configured to generate the graphical user interface comprising one or more transport controls for the remotely controllable apparatus, and the second logic is configured to respond to the one or more second data signals by controlling transport of a video program.

In another feature, the second logic is configured to generate the graphical user interface comprising one or more transport controls for the remotely controllable apparatus, to detect a movement of the cursor to one of the transport controls, and to generate the graphical user interface in which one of the transport controls is highlighted.

In a further feature, the second logic is configured to generate the graphical user interface comprising one or more functions relating to operation of a video media item in the remotely controllable apparatus, and the second logic is configured to respond to the one or more second data signals by performing one or more functions relating to operation of the video media item in the remotely controllable apparatus.

In still another feature, the second logic is configured to generate the graphical user interface comprising a graphical bar representing a duration of play of a video media item in the remotely controllable apparatus, and a graphical icon representing a current playback position of the video media item, and the second logic is configured to respond to the one or more second data signals by changing a current playback position of the video media item.

In yet another feature, the second logic is configured to receive the one or more second data signals representing movement of the graphical icon along the graphical bar. In a further feature, the second logic is configured to generate the graphical user interface comprising a second graphical bar representing an alternative branch of the video media item.

In still another feature, the second logic is configured to generate the graphical user interface comprising a second graphical bar that branches and rejoins the first graphical bar over a specified time region, and the second graphical bar represents any of an alternate scene of the video media item, alternate angle of the video media item, director's commentary, or actor's commentary. In another feature, the first logic is configured to generate an activation signal in response to the first touching, and the second logic is configured to generate the graphical user interface in which the graphical controls gradually appear over video imagery.

In yet another aspect, a system comprises a digital versatile disc (DVD) player comprising a wireless data receiver; a remote control, comprising a touch-sensitive device configured to detect a touching of the touch-sensitive device and convert the touching into one or more first data signals; a wireless data transmitter; and first logic coupled to the touch-sensitive device and to the wireless data transmitter; and the first logic is configured to receive the one or more first data signals, transform the one or more first data signals into one or more second data signals that are compatible with the DVD player, and communicate the one or more second data signals to the DVD player using the wireless data transmitter; and the DVD player comprises second logic that is configured to receive the one or more second data signals and to generate, based on the one or more second data signals, a graphical user interface for a video display comprising a cursor and one or more graphical controls for the remotely controllable apparatus.

2.0 EXAMPLE EMBODIMENTS

In one embodiment, a user interface and pointing device provide a mouse-and-cursor interface in a remote-control environment for a consumer electronics device. FIG. 1 illustrates a remote-control device of one embodiment.

In FIG. 1, remote-control device 100 comprises a housing 101 in which is mounted a touch-sensitive device 104. The touch-sensitive device 104 may comprise a capacitive sensing touchpad or a similar touch-sensitive device. Housing 101 may have a size similar to a standard consumer electronics (CE) remote control so that the housing can be held in a human hand 102 and the touch-sensitive device 104 can be manipulated using the fingers. In one embodiment, housing 101 weighs about 100 grams and is sized about 15 cm long, 10 cm wide, and 1 cm thick. Such dimensions are not critical and many other form factors can be used.

Remote-control device 100 comprises a wireless link 108 to a wireless data receiver 110 of a remotely controllable apparatus denoted as CE device 112. A video display 114, such as a television or monitor, is coupled to the CE device 112. The remotely controllable apparatus may be any device that interfaces, directly or indirectly, to the video display 114. Examples of the remotely controllable apparatus and CE device 112 include DVD players, VCRs, videotape players, DVD-CD players, personal computers, workstations, set-top boxes, satellite transceivers or decoder boxes, cable transceivers or decoder boxes, digital video recorders, and other audio or video electronic devices that may be directly coupled to a video display or indirectly coupled, for example, through a home network.

The wireless link 108 may comprise an infrared optical link, or may use a radio-frequency wireless link based upon Bluetooth, WiFi, or other low-power digital wireless connections and protocols.

Remote-control device 100 comprises one or more integrated circuits, other electronic devices, or other electronic digital logic in hardware, software, firmware or a combination, configured as described herein and configured to perform the functions described herein. Logic in the remote-control device 100 may comprise a processor or microcontroller, memory, a wireless transmitter, a driver circuit for the transmitter, an interface to the touch-sensitive device, and other input interfaces for hard buttons, a scroll wheel, and other hardware items that are further described herein for various embodiments. The remote-control device 100 may comprise one or more batteries and a power supply circuit configured to supply regulated voltage to other elements of the remote-control device 100. Logic in the remote-control device 100 also may comprise firmware encoded with computer program code that is configured to implement the functions described herein.

In an embodiment, user input on the remote-control device 100 causes the CE device 112 to perform an action, which may include providing feedback on the video display 114 coupled to the CE device. User input is provided by manipulating the touch-sensitive device 104 with a finger of the hand 102 using touching, gestures, tapping, or other movements.

No display of status is necessary on the remote-control device 100 in order to use the remote-control device. The wireless link 108 may be unidirectional such that the remote-control device 100 sends signals to the CE device 112, but the remote-control device does not receive signals back. Therefore, the remote-control device 100 may consume little power, and may be powered by a small number of AA sized batteries or AAA sized batteries.

In an alternative embodiment, the wireless link 108 may be bidirectional so that the CE device 112 can send return signals that confirm functions selected by the remote-control device 100. Thus, a two-way channel may be used for a handshake to make sure that selections are properly communicated from the remote-control device 100 to the CE device 112.

In an alternative embodiment, remote-control device 100 may comprise one or more status indicators in a display. The display may be integrated into the touch-sensitive device 104. Thus, embodiments are not limited to devices with no status display. For example, some degree of status awareness may be used to highlight different control-sets on the touch pad with selective backlighting. Embodiments with indicators or status awareness are described further below.

In an embodiment, housing 101 may comprises a touch-pad, a single Select button, and no other buttons.

Figure 2:
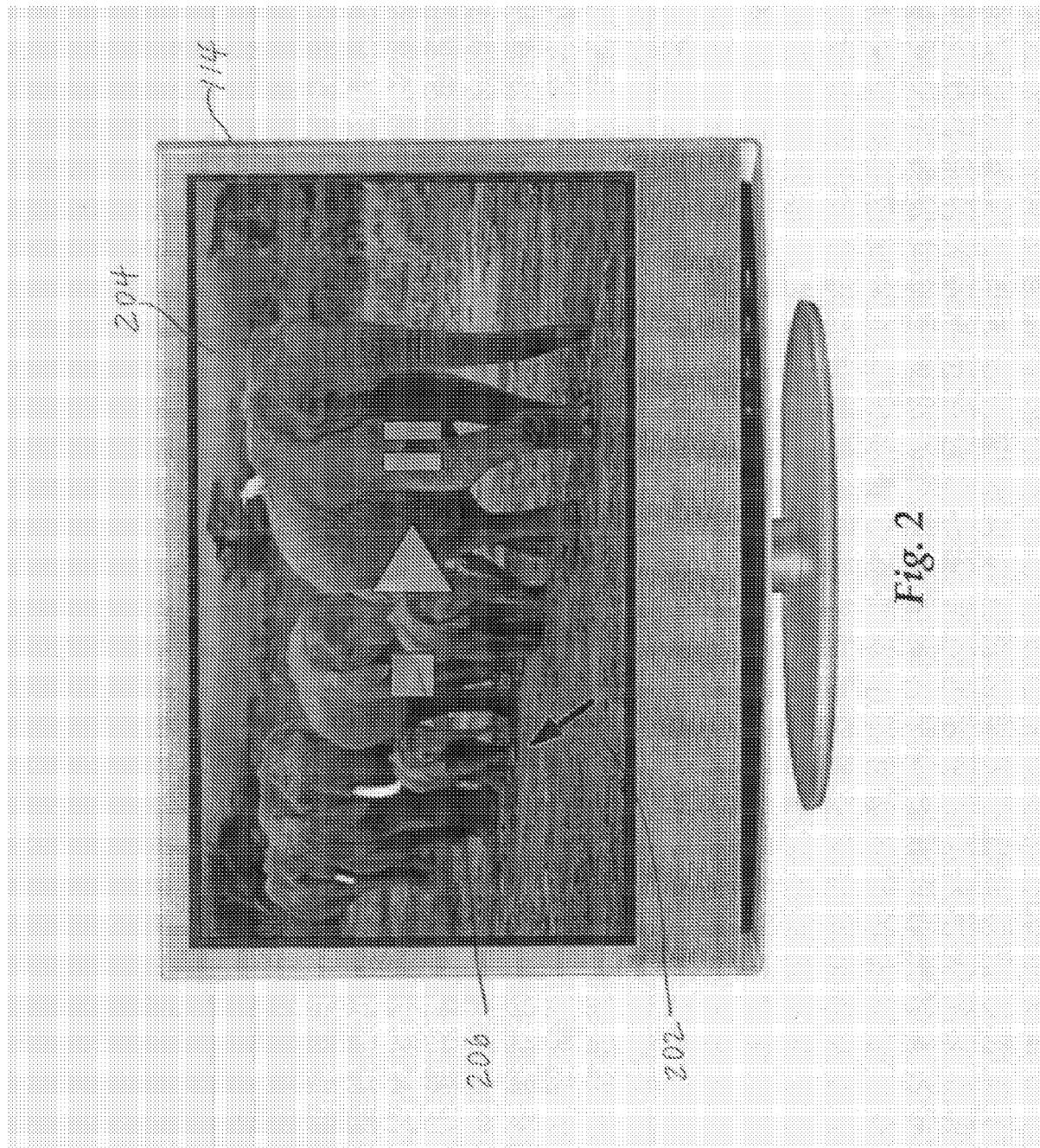
FIG. 2 illustrates a graphical user interface having playback control icons superimposed over a picture.

FIG. 2 illustrates a graphical user interface having playback control icons superimposed over a picture. In normal use, CE device 112 (FIG. 1) is displaying imagery 204 on the video display 114, such as a DVD movie, and there are no controls visible on the video display. In an embodiment, when a user picks up the remote-control device 100, the remote-control device sends an activation or "wake up" signal to the CE device 112 over wireless link 108. In one embodiment, the remote-control device 100 comprises a motion sensor switch, and logic in the remote-control device detects movement of the motion sensor switch and generates the activation signal in response to the movement. Alternatively, the remote-control device 100 detects that a user touches or strokes the touchpad, and generates a signal.

In response, the CE device 112 overlays a movable cursor 202 on the video display 114, and the CE device displays graphical representations of mode-appropriate controls 206 on the screen. In an embodiment, the CE device 112 causes the video display 114 to display the controls 206 as fading in, sliding in from an edge, or otherwise gradually appearing over the video or imagery 204 or other content on the screen of the video display. Alternatively, the controls may appear immediately over the content without any special video effect.

In an embodiment, when the CE device 112 is in a playback mode or a transport mode with respect to a video media item, the controls 206 comprise icons representing playing, pausing, and stopping playback. For example, if a DVD is playing, the mode-sensitive controls might be transport controls (Play, Stop, Pause, FF, RW, Next, Prev) and DVD Menu buttons. Alternatively, if playback of a DVD has finished, the mode-sensitive controls 206 may comprise player setup controls, an eject control, and a power-control. Thus, logic in the CE device 112 can cause the video display 114 to display different controls 206 depending on the then-current operational mode of the CE device.

Figure 3:
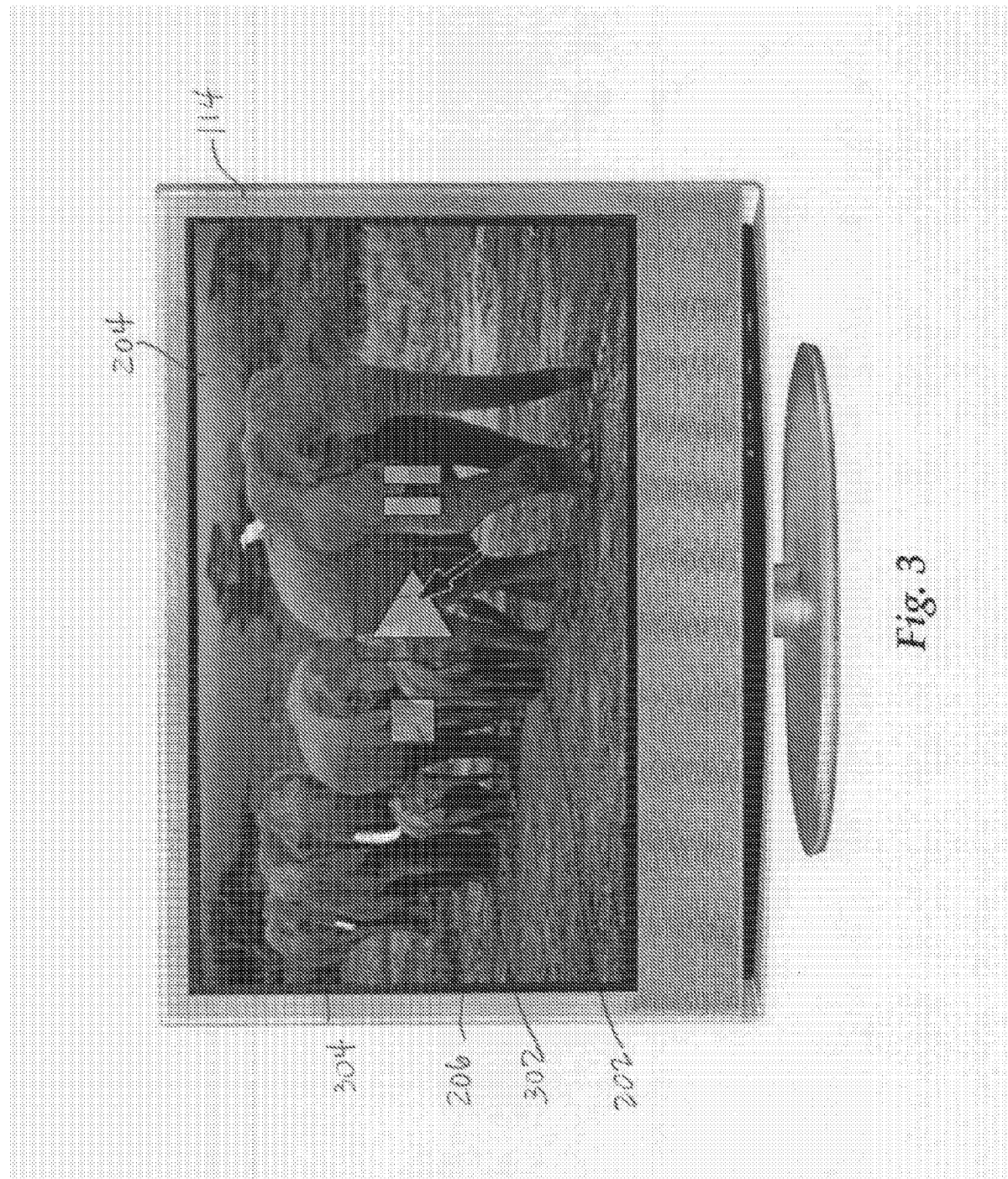
FIG. 3 illustrates the GUI of FIG. 2 in which an icon has been selected.

In an embodiment, using a thumb or finger of the hand 102, or using a stylus or other device, the user strokes the touch-sensitive device 104 with directional gestures that cause the cursor 202 to move on the screen of the video display 114. Clickable controls are highlighted as the cursor passes over the top. FIG. 3 illustrates the GUI of FIG. 2 in which an icon has been selected. In FIG. 3, the user has moved the cursor 202 using gestures on the touch-sensitive device 104 to a position over a Play icon 304 representing a Play function of the CE device 112. Because the triangle icon is a selectable control among the controls 206, in response, logic in the CE device 112 causes the video display 114 to display a highlight rectangle 302 around the Play icon 304. Definitions of which controls are selectable controls may be embodied in the logic in the CE device 112.

In an embodiment, by tapping or squeezing the touch-sensitive device 104, or pressing a Select button on housing 101 or integrated into the touch-sensitive device, the user operates the controls 206 on the screen of the video display 114. In an embodiment, after a pause (for example, in various embodiments, after a time period ranging from 500 mS to about 2 seconds), when the user has finished touching the remote control, the on-screen representations of controls 206 fade out, slide off the screen, or otherwise disappear.

Since the controls 206 are depicted on the screen of the video display 114, operation of the remote-control device 100 in a dark room requires no mental recall of the layout of specific buttons on the remote-control device; in contrast, conventional remote controls with multiple buttons require the user in a dark location to have memorized the layout of the buttons. In the present approach, the controls 206 are visible on the screen, and relative motion gestures using the touch-sensitive device 104 can operate the controls.

In an embodiment, functions that are normally buried deep inside system submenus, or must be selected by toggling a special button on the conventional remote control, which may be one of dozens of special-purpose buttons, such as choosing a soundtrack or subtitle overlay, are exposed more directly in the form of on-screen choices overlaying the video.

Figure 4:
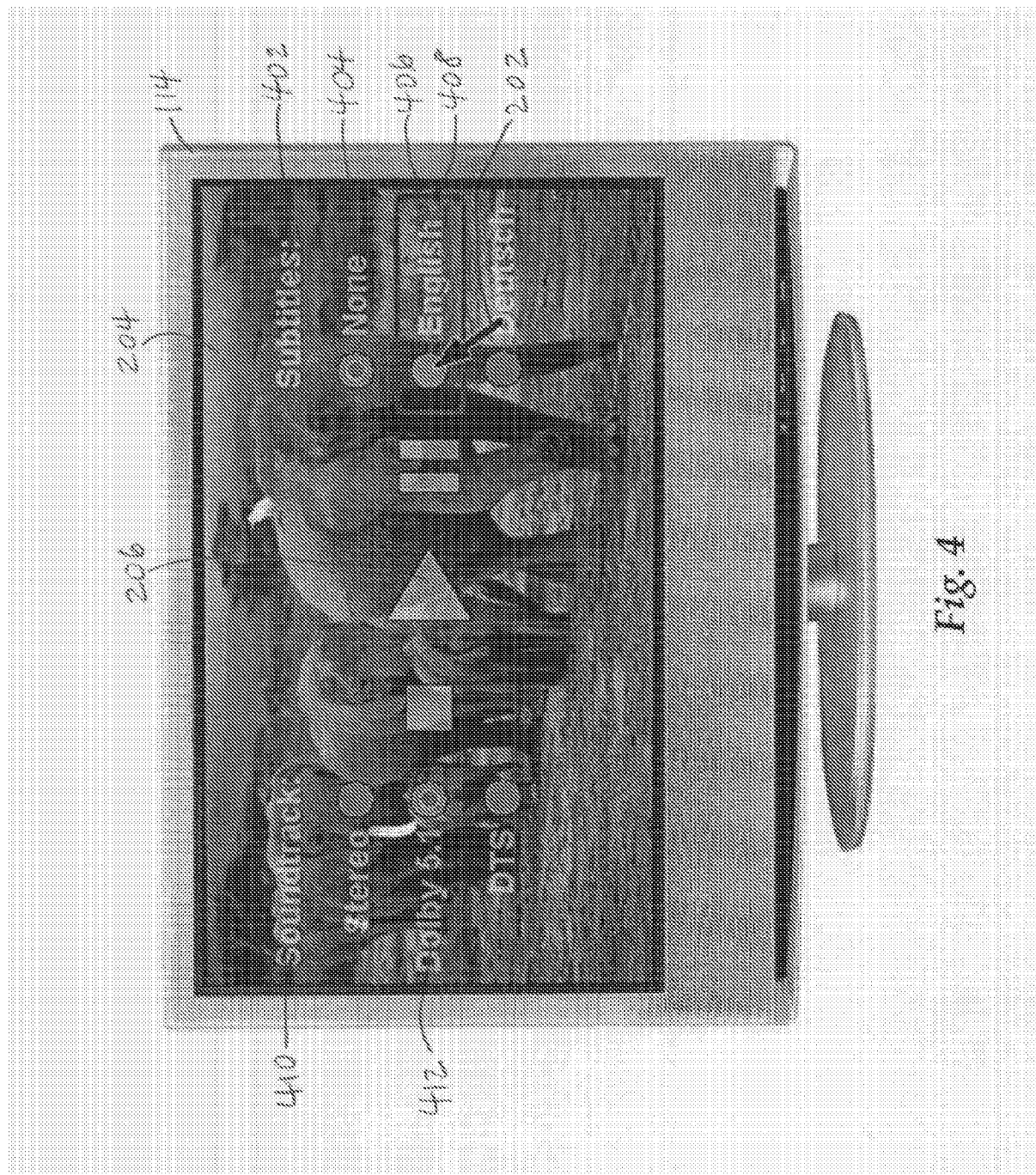
FIG. 4 illustrates the GUI of FIG. 2 having icons for configuration of a player.

FIG. 4 illustrates the GUI of FIG. 2 having icons for configuration of a remotely controllable apparatus. In FIG. 4, video display 114 displays imagery 204 and has one or more controls 206 displayed over the imagery. The controls may relate to operational functions of a video media item that is in the CE device 112, such as a DVD or videotape. Alternatively, the controls may relate to configuration parameters of the CE device 112.

In an embodiment, logic in CE device 112 causes the video display 114 to display information relating to operational functions of a video media item that is in the CE device, including a Subtitles function 402 that comprises a None choice 404, English choice 406, and Deutsch choice. In FIG. 4, the None choice 404 is selected, but the user has manipulated touch-sensitive device 104 to cause cursor 202 to move over the English choice 406, and in response, the CE device causes the video display 114 to display a highlight box 408 around the English choice 406.

Further, in FIG. 4, logic in CE device 112 has caused the video display 114 to display a Soundtrack function 410, in which a Dolby option 412 is selected, over the imagery 204. The displayed functions shown in FIG. 4 are merely examples of functions of a CE device 112 that can be displayed in video display 114 for selection using the remote-control device 100. Other embodiments may implement other functions.

In an embodiment, CE device 112 may generate and send sounds to the video display 114, or to an audio amplifier and speaker system coupled to the CE device, to provide aural feedback for user operations of clicking or dragging using the remote-control device 100. CE device 112 also may generate sounds responsive to a user moving the cursor 202 on top of a control 206 or other control that may be manipulated.

In an embodiment, different sounds may be used to indicate an error when the user is attempting to manipulate a control that is inappropriate in the current context. For example, if a user attempts to click "Play" when the video is already playing, CE device 112 may receive generate and send an error sound.

In still another embodiment, the sounds may comprise synthesized speech or playback of digitally recorded speech that repeats the name of a control, icon, menu, option, or other information on the screen. Such an embodiment may assist the user in interpreting the meaning of controls, icons, menus options or other information shown on the screen. For example, when abbreviations are used in the information on the screen, audible speech can provide full function names and/or prompts in how to operate the CE device 112 or how to interact with the information on the screen.

Figure 5:
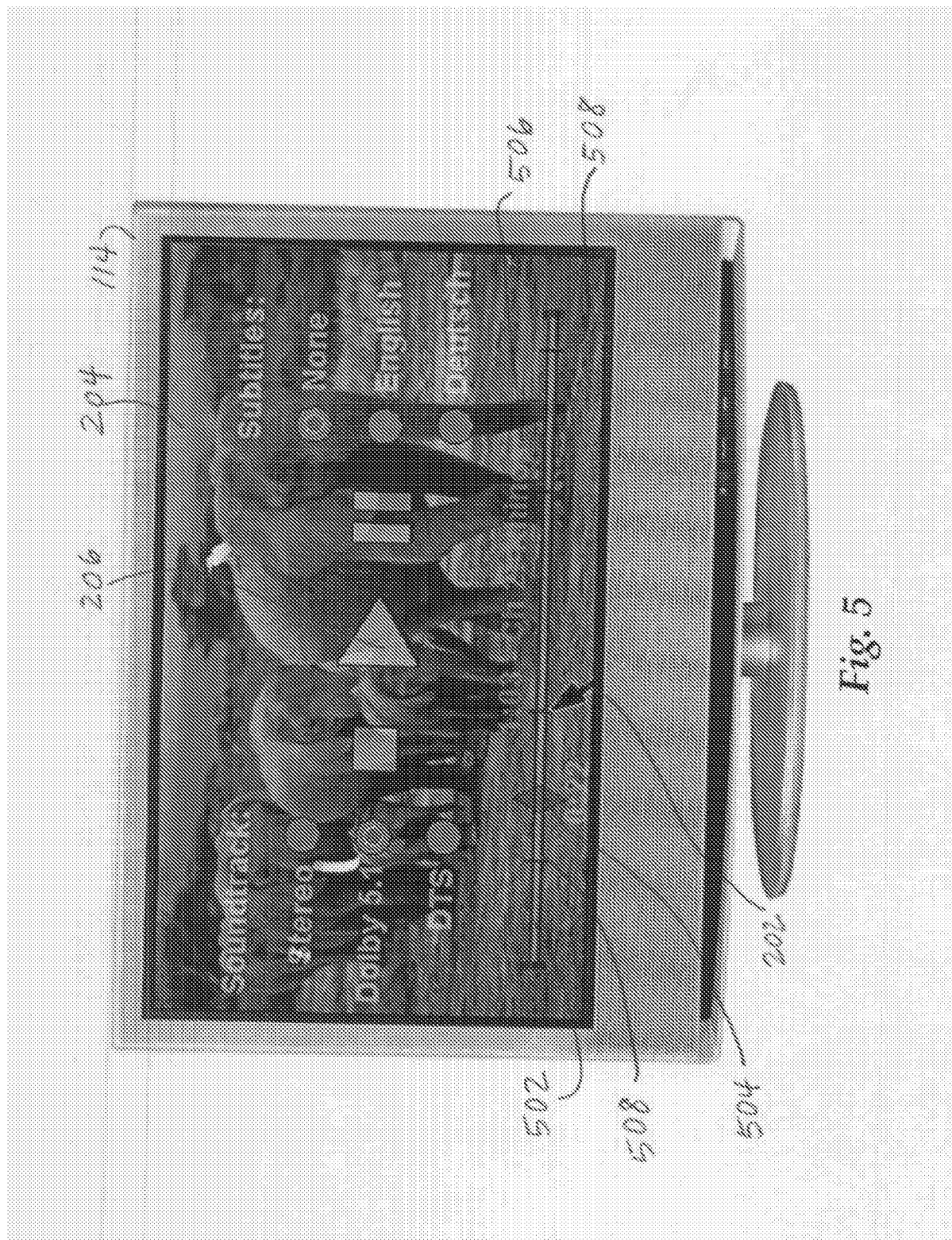
FIG. 5 illustrates the GUI of FIG. 4 having controls for playing a program.

An embodiment may provide for direct manipulation of transport controls of the CE device 112. FIG. 5 illustrates the GUI of FIG. 4 having controls for playing a program.

In an embodiment, for a DVD player or similar device that renders a time-varying presentation, in which transport control (Play, Stop, Pause, FF, RW, Next, Prey, etc.) are appropriate, logic in CE device 112 may cause video display 114 to display transport controls 206 that represent transport functions.

Alternatively, logic in CE device 112 causes video display 114 to display a bar 502 (FIG. 5) that represents the time required to completely play a particular video program. The bar 502 comprises a "now" icon 504 representing a point in the video program that is currently shown on the video display as the imagery 204. Using remote-control device 100, a user can position the cursor 202 over the icon 504, select the icon, and drag or more the icon along the bar 502. In response, logic in CE device 112 moves playback of the video program to a different time point. Therefore, a user can directly control transport and playback of the video program, without using conventional controls such as FF, RW, Next, and Prev.

In an embodiment, user gestures performed using the touch-sensitive device 104, such as pointing at the "now" icon 504 and keeping finger contact on the touchpad or pressure on a select button may cause CE device 112 to perform transport functions such as Pause or Stop.

In an embodiment, a user gesture using the touch-sensitive device 104, such as a double-tap, may cause CE device 112 to perform a Play transport function.

In an embodiment, a user gesture using the touch-sensitive device 104, such as a triple-tap, may cause CE device 112 to perform a Fast Forward transport function.

In an embodiment, bar 502 comprises one or more marks 508 that represent chapters or indices. Such marks 508 provide a user with visual cues about likely points in time to which to skip forward or rewind.

In an embodiment, user gestures using the touch-sensitive device 104, such as dragging the icon 504 forward or backward, may cause logic in CE device 112 to modify the user gestures when they occur near the marks 508, to give the marks a sense of "gravity" or "magnetism." For example, when the icon 504 is near a mark 508, the icon is snapped to exactly hit the mark.

In an embodiment, bar 502 comprises highlighting or other graphically distinguishing marks that identify commercial content in the video program represented in the bar. Such marks or highlighting enable a user to easily navigate past the commercial content.

In an embodiment, alternative angle scenes or variations may be displayed as parallel timelines using multiple bars 502 in the video display 114. In an embodiment, the multiple bars may be displayed to branch and rejoin to represent the time regions for which different angle scenes are available. Different scenes represented using different bars include alternative endings, director's and actors' commentary soundtracks, etc.

As an example, assume that a DVD media item comprises a director's commentary, ten minutes of alternative angle shots of a key scene, and a different ending. In an embodiment, a user touches the touch-sensitive device 104, and in response, logic in CE device 112 causes the video display 114 to display a thick timeline or bar 502 to indicate the current version. Logic in CE device 112 also causes the video display 114 to show a second, thinner timeline or bar below that represents the program with director's commentary. Moving the cursor 202 over the second, thinner timeline or bar and selecting the thinner timeline or bar using the touch-sensitive device 104 causes logic in the CE device 112 to switch to the director's commentary version on the DVD.

Continuing with the example, assume that two seconds before up to ten seconds after the beginning of the section with alternative scene angles, logic in CE device 112 causes the bar 502 or timeline to fade in automatically over the imagery 204 of the video display 114, showing a thin line branching off the main timeline. Selecting the thin branch in the manner indicated above causes the logic in the CE device 112 to choose the alternative scene angle. Selecting the main branch causes the logic in the CE device 112 to jump back to the main angle. Similarly, at the point in time where the alternative ending is possible, logic in the CE device 112 causes the timeline to fade in on the video display 114 with a branch visible. Selecting the timeline in the manner indicated above chooses the alternative timeline.

In an embodiment, the remote-control device 100 and logic in the CE device 112 providing a pointing interface as described herein enable navigating rich user content. In particular, providing a pointing interface for a CE device 112 having a video display 114 enables a user to navigate a dense, rich set of options and alternatives, in a manner similar to a website. As an example, assume that 100,000 movie titles are available to play on a streaming Internet movie player. The remote-control device 100 and logic of a CE device 112 described herein, providing a pointing interface, provides a user with the ability to browse, choose, select categories, pick and choose rich meta-content to aid in making choices, etc. This approach is far easier to accomplish the much more limited left-right-up-down-select interfaces of prior approaches using conventional multi-button remote controls.

Figure 6:
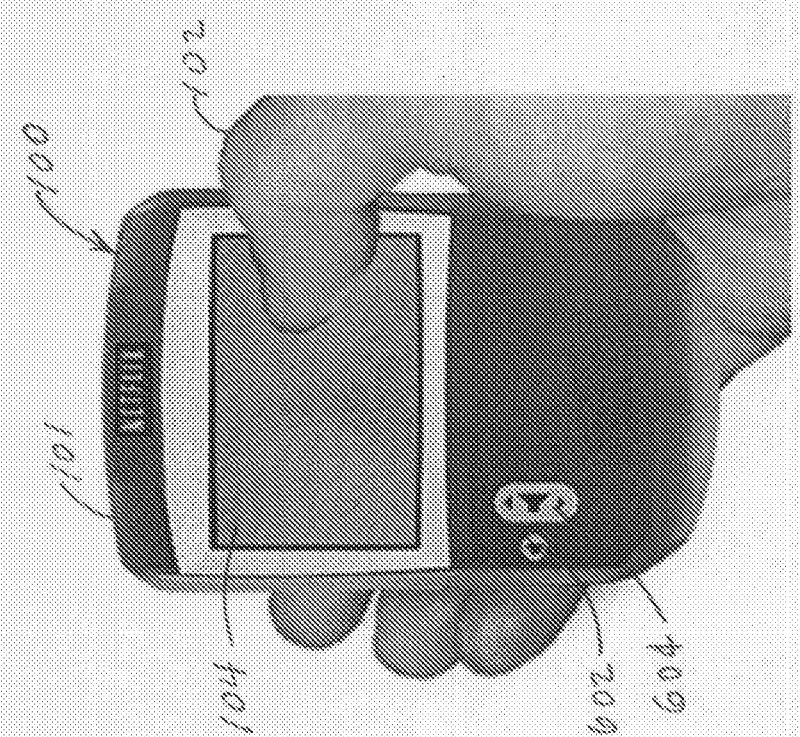
FIG. 6 illustrates the device of FIG. 1 having hard buttons for operating a consumer electronics device.

In an embodiment, remote-control device 100 comprises one or more selected dedicated "hard" function buttons. FIG. 6 illustrates the device of FIG. 1 having hard buttons for operating a consumer electronics device. In the embodiment of FIG. 6, remote-control device 100 comprises touch-sensitive device 104 and only a Mute button 602 and a Volume Up/Down button 604 in housing 101. Embodiments including only commonly used buttons in the form of hard buttons that are easy to feel in the dark, and that do not intrude on the imagery 204 of the video display 114 by causing CE device 112 to display virtual buttons on the video display.

Figure 7:
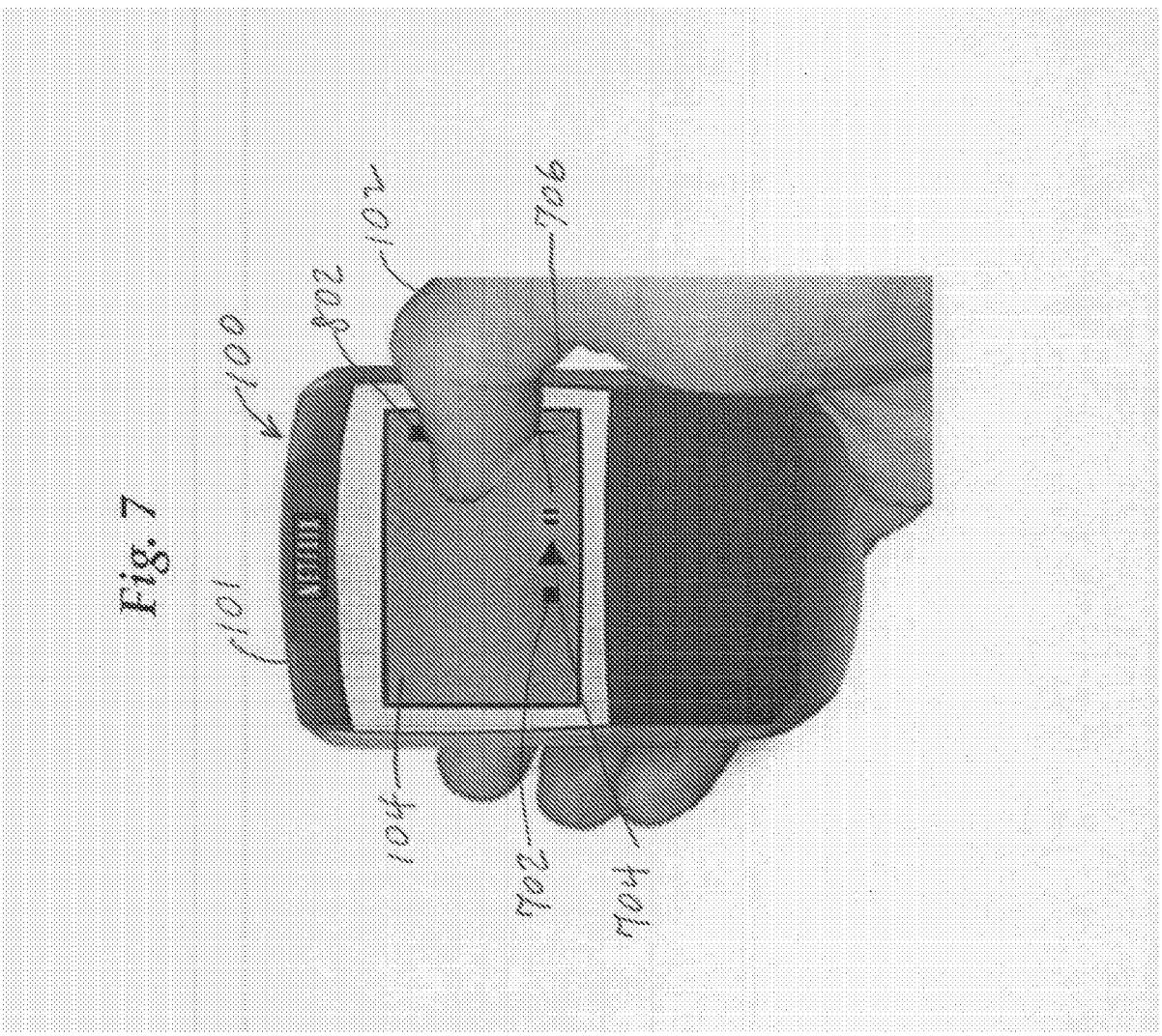
FIG. 7 illustrates the device of FIG. 1 regions of a touch-sensitive device that function as dedicated buttons.

In an embodiment, one or more regions of the touch-sensitive device 104 function as dedicated buttons. FIG. 7 illustrates the device of FIG. 1 regions of a touch-sensitive device that function as dedicated buttons. In FIG. 7, touch-sensitive device 104 comprises a first region 702 that functions as a dedicated Stop button, a second region 704 that functions as a dedicated Play button, and a third region 706 that functions as a dedicated Pause button. Alternative embodiments may comprise any number of regions that function as dedicated function buttons. In an embodiment, a user gesture or touch on a particular region causes logic in the remote-control device 100 to detect the region that was selected based on its horizontal and vertical position in the touch-sensitive device, and to generate and send a specified signal to the CE device 112 indicating the function selection.

In various embodiments, regions of the touch-sensitive device 104 that function as dedicated buttons may be identified by a texture imprinted on the touch-sensitive device, identified by printing, such as silkscreen, offset printing, etc., on the touchpad, or identified by selective backlighting, perhaps colored, on the touch-sensitive device 104. In an embodiment, regions of the touch-sensitive device 104 that function as dedicated buttons may be mode sensitive. Thus, the selection of a particular region on the touch-sensitive device may cause logic in the CE device 112 to perform a different function depending on the then-current operational mode of the CE device.

Figure 8:
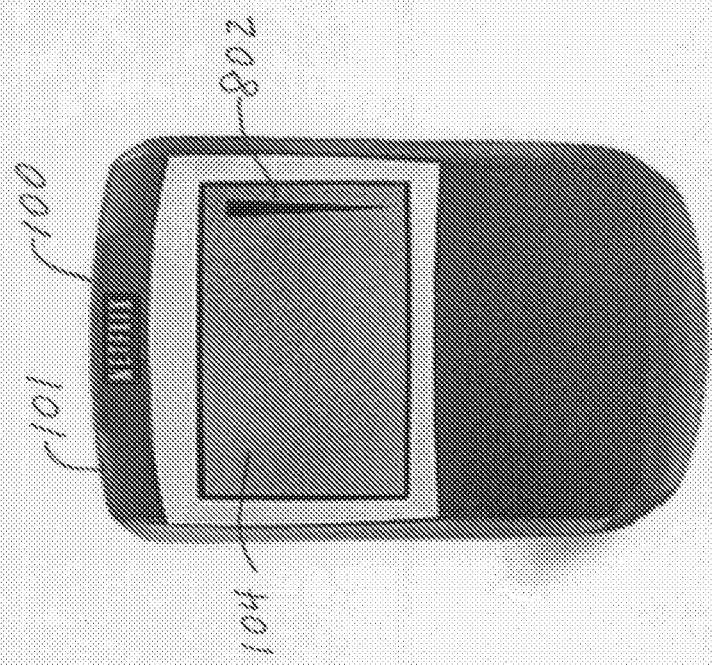
FIG. 8 illustrates the device of FIG. 1 having a control for a quantitative parameter.

In an embodiment, one or more regions of the touch-sensitive device 104 may provide control of quantitative parameters. FIG. 8 illustrates the device of FIG. 1 having a control for a quantitative parameter. In an embodiment, a control for a quantitative parameter comprises a slider 802 that is printed or displayed on the touch-sensitive device 104. A user gesture comprises touching and dragging on the slider 802 on the touch-sensitive device 104. In response, logic in CE device 112 changes one or more quantitative parameters of the CE device or the video display 114. Examples of quantitative parameters include volume control, brightness, speed, color, tone, etc. In one example of operation, a user strokes the touch-sensitive device 104 up or down a designated zone of the touch-sensitive device to manage volume of the video display 114; upward strokes cause logic in the CE device to increase volume, downward strokes decrease the volume.

FIG. 8 slows a slider that is generally linear in form. However, alternate embodiments may provide other forms of controls for quantitative parameters, such as circular controls, angled controls, etc.

In another embodiment, remote-control device 100 incorporates a scroll wheel for adjustment of quantitative parameters. In this embodiment, remote-control device 100 comprises a small wheel or roller on the side or top of the housing 101 which, when manipulated by a user, causes the CE device 112 to change volume, timeline, or other quantitative parameters of a video program, the video display 114, or the CE device 112.

In the foregoing specification, the invention has been described with reference to specific embodiments thereof. However, various modifications and changes may be made thereto without departing from the broader spirit and scope of the invention. The specification and drawings are, accordingly, to be regarded in an illustrative sense rather than a restrictive sense.

What is claimed is:

1. A remote control, comprising:
a touch-sensitive device configured to detect a touching of the touch-sensitive device and convert the touching into one or more first data signals;
a wireless data transmitter; and
logic coupled to the touch-sensitive device and to the wireless data transmitter, wherein the logic is configured to receive the one or more first data signals, transform the one or more first data signals into one or more second data signals that are compatible with a remotely controllable apparatus, and communicate the one or more second data signals to the remotely controllable apparatus using the wireless data transmitter, wherein the one or more second data signals cause the remotely controllable apparatus to generate a graphical user interface (GUI), comprising:
a first graphical bar representing a duration of play of a video media item in the remotely controllable apparatus and including a current playback indicator icon representing a current playback point for the video media item, and
a second graphical bar that corresponds to an alternative video content having a predefined association with a portion of the video media item at a specified time region of the video media item, wherein the second graphical bar is depicted as branching from the first graphical bar at the beginning of the specified time region and rejoining the first graphical bar at the end of the specified time region, wherein the second graphical bar is displayed within the GUI responsive to playback of the video media item reaching the beginning of the specified time region, wherein a selection of the second graphical bar causes the remotely controllable apparatus to switch playback to the alternative video content, and wherein the alternative video content represents at least one of (i) an alternate scene for the portion of the video media item, (ii) an alternate viewing angle for the portion of the video media item, and (iii) a commentary for the portion of the video media item.

2. The remote control of claim 1, further comprising one or more hard buttons coupled to the logic, wherein the logic is further configured to detect operation of the one or more hard buttons, generate the one or more second data signals representing operation of the one or more hard buttons, and communicate the one or more second data signals representing operation of the one or more hard buttons to the remotely controllable apparatus using the wireless data transmitter.

3. The remote control of claim 1, wherein the touch-sensitive device comprises a linear region representing control of a quantitative parameter of the remotely controllable apparatus, wherein the logic is further configured to detect a third touching of the linear region, generate the one or more second data signals representing the third touching of the linear region, and communicate the one or more second data signals representing the third touching of the linear region to the remotely controllable apparatus using the wireless data transmitter.

4. The remote control of claim 1, wherein the remotely controllable apparatus transmits, via the wireless data transmitter, one or more return data signals to the touch-sensitive device acknowledging the touching of the touch-sensitive device.

5. A system, comprising:
a processor; and
a memory containing computer readable program code that, when executed by the processor, performs an operation for generating a graphical user interface (GUI) during playback of a video media item, the operation comprising:
generating a first graphical bar representing a duration of play of a video media item in a remotely controllable apparatus and including a current playback indicator icon representing a current playback point for the video media item, and
generating a second graphical bar that corresponds to an alternative video content having a predefined association with a portion of the video media item at a specified time region of the video media item, wherein the second graphical bar is depicted as branching from the first graphical bar at the beginning of the specified time region and rejoining the first graphical bar at the end of the specified time region, wherein the second graphical bar is displayed within the GUI responsive to playback of the video media item reaching the beginning of the specified time region, wherein a selection of the second graphical bar using a cursor causes the remotely controllable apparatus to switch playback to the alternative video content, and wherein the alternative video content represents at least one of (i) an alternate scene for the portion of the video media item, (ii) an alternate viewing angle for the portion of the video media item, and (iii) a commentary for the portion of the video media item.

6. The system of claim 5, the operation further comprising:
providing one or more transport controls for the remotely controllable apparatus, and
responding to one or more data signals by controlling transport of a video program.

7. The system of claim 5, the operation further comprising:
providing a transport control for the remotely controllable apparatus, to detect a movement of the cursor to the transport control, and
generating the graphical user interface in which the transport control is highlighted.

8. The system of claim 5, the operation further comprising:
providing one or more functions relating to operation of the video media item in the remotely controllable apparatus, and
responding to one or more data signals sent to the remotely controllable apparatus by performing one or more functions relating to operation of the video media item.

9. The system of claim 5, the operation further comprising:
receiving one or more data signals representing movement of a graphical icon along the first graphical bar.

10. The system of claim 5, the operation further comprising:
receiving an activation signal in response to a touching of a touch-sensitive device, and generating the graphical user interface in which graphical controls gradually appear over video imagery of the video media item.

11. The system of claim 5, the operation further comprising:
providing one or more functions relating to operation of a DVD in a DVD player, and
responding to one or more data signals by performing one or more functions relating to operation of the DVD.

12. A method of generating a graphical user interface (GUI) during playback of a video media item, comprising:
generating a first graphical bar representing a duration of play of the video media item in a remotely controllable apparatus and including a current playback indicator icon representing a current playback point for the video media item, and
generating a second graphical bar that corresponds to an alternative video content having a predefined association with a portion of the video media item at a specified time region of the video media item, wherein the second graphical bar is depicted as branching from the first graphical bar at the beginning of the specified time region and rejoining the first graphical bar at the end of the specified time region, wherein the second graphical bar is displayed within the GUI responsive to playback of the video media item reaching the beginning of the specified time region, wherein a selection of the second graphical bar causes the remotely controllable apparatus to switch playback to the alternative video content, and wherein the alternative video content represents at least one of (i) an alternate scene for the portion of the video media item, (ii) an alternate viewing angle for the portion of the video media item, and (iii) a commentary for the portion of the video media item.

\* \* \* \* \*